Jan. 31, 1928.
L. MASTRANGEL
1,657,834
SHOCK ABSORBER
Filed April 11, 1924
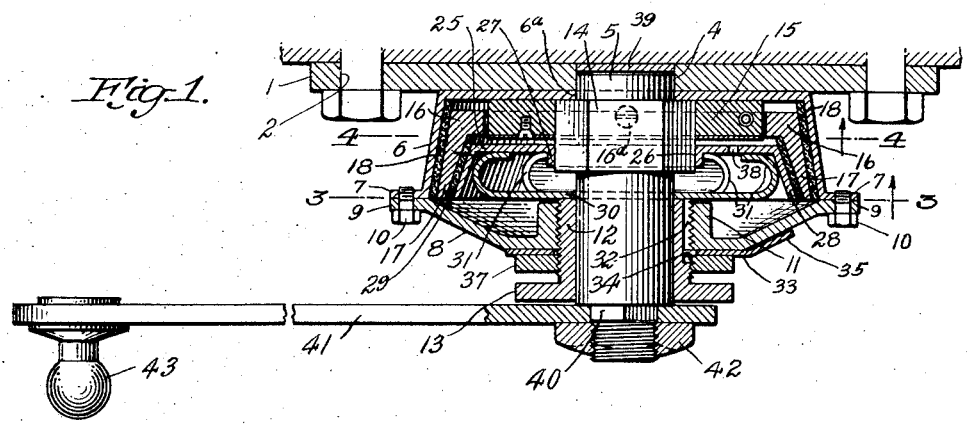
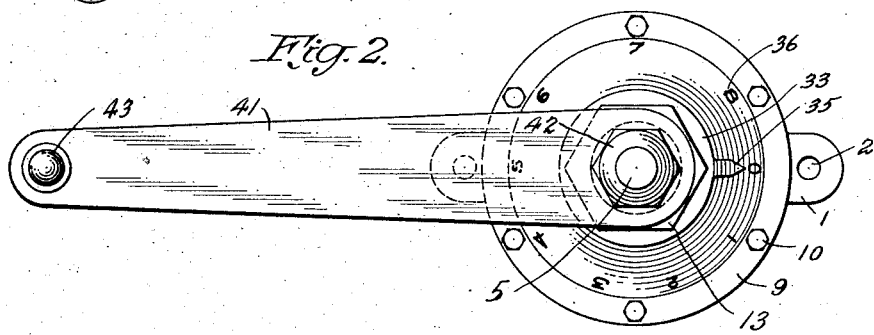
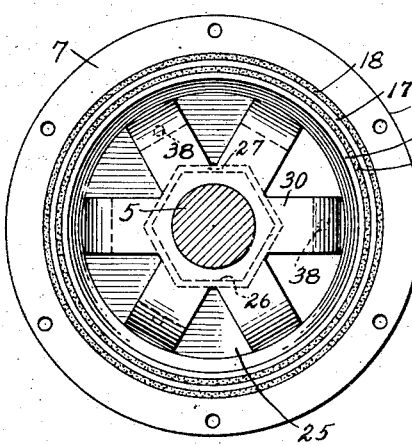 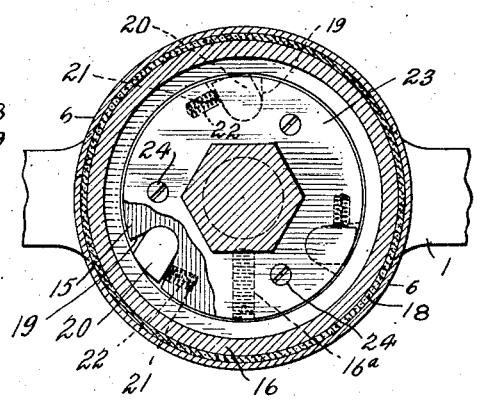
INVENTOR.
LOUIS MASTRANGEL
BY Stockbridge & Borst.
ATTORNEYS Patented Jan. 31, 1928.

1,657,834

UNITED STATES PATENT OFFICE.

LOUIS MASTRANGEL, OF WEST HOBOKEN, NEW JERSEY.

SHOCK ABSORBER.

Application filed April 11, 1924. Serial No. 705,737.

This invention relates to shock absorbers for vehicles such as may be employed for controlling the relative approaching and separating movements of the chassis frame and axle. Various attempts have been made heretofore to utilize friction for controlling the relative movements of the chassis frame and axle, but have been unsatisfactory for various reasons. Such devices either controlled the movement solely in one direction or equally in both directions. Where the relative movement of the frame and axle is controlled equally in both directions, the relative downward movements of the chassis frame are retarded to such an extent that the resilient suspension cannot function properly. Consequently the minor vibrations or movements between the frame and axle will not be entirely taken up in the suspension but will be transmitted to the frame so that the vehicle does not have the smooth and free riding qualities which are desirable. On the other hand, if the control of the frame and axle acts only in one direction, the frame frequently obtains too much inertia while moving in the direction which is uncontrolled, so that they are more difficult to control properly when movement in the opposite direction takes place immediately following.

An object of this invention is to provide an improved shock absorber which will control the relative movements of the frame and axle in both directions, but provide the desired amount of resistance to their relative movement, which desired amount is unequal in the two different directions of the relative movement; which will improve the riding qualities of a vehicle to which it is attached; and which will be exceptionally simple, compact, light in weight, durable and relatively inexpensive. Other objects and advantages will be apparent from the following description of an embodiment of the invention and the novel features will be particularly pointed out hereinafter in claims.

In the accompanying drawing:—

Fig. 1 is a sectional plan through a shock absorber constructed in accordance with the invention;

Fig. 2 is a side elevation of the same;

Fig. 3 is a sectional elevation of the same taken substantially along the line 3—3 of Fig. 1; and Fig. 4 is another sectional elevation of the same taken substantially along the line 4—4 of Fig. 1.

In the illustrated embodiment of the invention a base element 1 is stamped from flat bar or rolled metal and at its ends, which may be reduced in width, it is provided with suitable apertures 2 through which suitable securing screws or bolts 3 may be passed into one of the parts, such as the chassis frame, whose relative travel or movement is to be controlled. The base member 1 is provided centrally with an aperture 4 in which one end of a shaft 5 may have a rotatable bearing.

A cup shaped shell 6, having a peripheral flange 7 around its open edge, is stamped and drawn by means of suitable dies and tools from sheet metal, and in its bottom wall is provided with an aperture $6^a$ which is aligned with and at least as large as the aperture 4 of the base member 1. The cup shaped shell 6 is secured at its bottom wall against the base member 1 in any suitable manner, but preferably by spot welding of the bottom wall to the base member. The lateral wall of the casing shell 6 is outwardly divergent so as to provide a frusto-conical seat.

A cover 8, having a peripheral flange 9 is secured against the open face of the shell 6 with the flange 9 fitting against and aligned with the flange 7 of the shell 6. The two flanges are screwed together in any suitable manner, such as by bolts or rivets 10 which pass through the flanges. If desired, suitable gaskets may be inserted between the flanges but ordinarily they are not required, especially where either the cover 8 or the casing shell is made of sheet metal. The cover 8 is provided with an inwardly extending boss 11 having an aperture parallel with its axis and internally threaded. A bushing 12 is threaded into the threaded aperture in the tubular boss 11, so as to be adjustable therethrough to various extents, and at its outer end is provided with a head 13 having a non-circular periphery for receiving a suitable tool.

The shaft 5, in the portion within the casing, is provided with an enlarged non-circular section 14 which abuts against the bottom wall of the shell 6, and a disc 15 is fitted closely over this enlarged section. The disc 15 may be held against endwise movement along the shaft 5 in any suitable manner such as by a set screw $16^a$ passing through the disc and engaging the shaft. A ring member 16 is fitted over the disc so as to surround the same, and has a flange portion 17 extending away from the bottom wall of the shell 6. The outer periphery of the flange 17 is substantially concentric with the inner periphery of the lateral wall of the shell 6 so as to nest therein, and the inner periphery of the flange is outwardly divergent, preferably to a slightly greater extent than the frusto-conical seat of the shell 6.

A lining ring 18 of suitable frictional material such as brake lining, fibre, etc., may be inserted between the flange 17 and the frusto-conical seat of the shell 6, so as to increase the frictional resistance to the rotation of the ring 16 within the shell.

A suitable one way coupling or clutch connection is provided between the disc 15 and the ring 16, so that when the disc rotates with the shaft 5 in one direction, the ring 16 will be rotated concomitantly therewith, and when rotated in the opposite direction, the ring 16 will not be driven therefrom. As a preferred form of one way clutch, the disc 15 is provided in its periphery with notches 19, the side walls of which are outwardly divergent. A clutch element 20 is inserted in each notch so as to rock upon the inner end wall of the notch, from one side wall of the notch towards the other. Each clutch element is of such length and its outer end is so shaped that when rocked in one direction upon the inner end wall of its notch it will engage with the inner periphery of the ring 16 and wedge or clutch the ring and disc together. A suitable compression spring 21 may be inserted in a recess 22 in one of the side walls of each notch 19, so as to constantly urge the clutch element in a direction to clutch the ring and disc together.

Since the disc 15 abuts against the bottom wall of the shell 6, the clutch element cannot escape from the disc at that face, and a confining plate 23 may be secured in any suitable manner, such as by screws 24, to the opposite face of the disc 15 so as to overlie the notches 19 and prevent escape of the clutch elements from that face. It will be understood, of course, that a single clutch element may be provided, or a plurality as shown.

The cup shaped brake element 25 is preferably of die-stamped sheet metal, and is provided with a central aperture 26 surrounded by an inwardly extending tubular flange 27. The enlarged section 14 of the shaft 5 passes through the aperture 26, so that the tubular flange will surround and conform closely to the periphery of the enlarged section 14 of the shaft. The brake element 25 will therefore be always rotated with the shaft and at the same time will be free to slide along the same in an axial direction. The peripheral lateral wall 28 of the cup shaped brake element 25, is outwardly divergent and nests within the inner periphery of the flange 17 of the brake ring 16. A suitable friction lining 29 similar to the lining 18 may be interposed between the lateral wall 28 of the brake element 25 and the inner peripheral surface of the flange 19, so that relative rotation of the brake ring 16 and brake element 25 will be frictionally resisted.

A spider-shaped spring element 30 is fitted over the shaft 5 and the ends 31 of the spider arms are preferably doubled back upon themselves along and in spaced relation to one face of the spring element, pressing upon the inner face of the bottom wall of the cup-shaped brake element 25. The bushing 12 at its inner end abuts against the outer face of the spring element 30, so as to press it inwardly and provide a yielding pressure upon the brake element 25. The latter will in turn press the brake ring 16 against the seat in the shell 6. The extent of this pressure of the spring element 30 may be varied to some extent by threading the bushing 12 through the cover to various extents.

A key slot 32 is provided lengthwise upon the outer periphery of the bushing 12, and a pointer 33 through which the bushing passes is provided with an inwardly extending tongue 34 which enters the keyway or slot 32 and serves as a key sliding in the keyway or slot to cause rotation of the pointer with the bushing while permitting independent movement of the bushing through the pointer to various extents. The pointer is provided with an indicating tip 35 which overlies the outer face of the cover and cooperates with suitable indicating indicia 36 thereon for indicating the various angular adjustments of the bushing.

A lock nut 37 may be provided upon the outer end of the bushing so that when the latter has been adjusted to any desired position, the nut may be tightened and lock the bushing to the cover. The lock nut 37 will of course be loosened before adjustments of the bushing 12 are made, and tightened when the adjustments have been completed.

The interior of the casing is filled with a suitable lubricant, and in order that the lubricant may reach all parts of the mechanism within the casing, the brake element 25 in its bottom wall is preferably provided with one or more apertures 38 through which the lubricant may pass. The outer end of the aperture 4 of the base member 1 may be closed by a suitable plug 39 so as to prevent escape of any of the lubricant therethrough.

The outer end of the shaft 5 is reduced in cross section and made non-circular as at 40, and a suitable operating lever 41 is fitted over this non-circular portion 40 of the shaft so as to serve as rotating means therefor. A nut 42 is threaded upon the reduced extreme outer end of the shaft 5 and serves to confine the arm or lever 41 upon the shaft. The free end of the arm or lever 41 may have a pin 43 or other provision for its attachment to one of the parts, such as the axle, whose relative movements are to be controlled.

In the use of the device, the base member 1 is secured to one of the parts to be controlled, such as to the chassis frame, and the free end of the arm or lever 41 is secured or connected in any suitable manner to the other part whose relative movement is to be controlled, such as the axle. When the frame and axle approach and separate the arm or lever 41 will be rocked and the shaft 5 oscillated. The shaft will oscillate the brake element 25 in both directions and the brake ring 16 in one direction. When the brake ring and the brake element 25 are both rotating with the shaft, the frictional resistance to rotation of the shaft will be that existing almost solely by the friction between the ring 16 and the frusto-conical seat in the shell 6. This, then, is the amount of the frictional resistance to the relative movement of the frame and axle in one direction.

When the frame and axle move in the opposite direction, the one way clutch will release the ring 16, and by reason of its frictional engagement in the frusto-conical seat of the shell 6, the ring will remain stationary and will frictionally engage with the brake element 25 and resist its rotation with the shaft, so that the total resistance to the relative movement of the frame and axle in this direction practically will be the frictional resistance between the ring 16 and the brake element 25. To insure that the ring 16 remains stationary during this last mentioned movement, its frictional contact area with the frusto-conical seat of the shell 6 may be made greater than the area of its frictional contact with the brake element 25. The frictional resistance to rotation of the shaft 5 may be varied to some extent by the adjustments of the bushing 12 which varies the pressure exerted by the spring element upon the brake ring and the brake element.

The one-way clutch is preferably so disposed or arranged that it becomes effective to cause rotation of the brake ring with the shaft when the chassis frame and axle are moving apart, that is, during a rebound, and to release the brake ring from the shaft 5 during the relative approach of the frame and axle, that is, on the relatively downward movement of the frame. The minor frictional resistance will therefore be effective whenever the frame and axle approach, and major resistance will be effective during the rebound or separation of the axle and frame.

By having the minor resistance effective when the axle and frame approach, the sensitiveness of the spring suspension will not be materially interfered with and at the same time some resistance will be offered to the relative approach of the parts so as to retard the major relative movements between them. The maximum resistance will be exerted during the rebound which causes the most discomfort to the occupants of the vehicle, and also serves to prevent danger of breakage of the spring forming the suspension between the frame and axle.

It will be obvious that various changes in the details and arrangements of parts, herein described and illustrated for the purpose of explaining the nature of the invention, may be made by those skilled in the art within the principle and scope of the invention as expressed in the appended claims.

I claim:—

1. In a shock absorber for vehicles an enclosed casing having a frictional side wall, a shaft rotatable in said casing, an element in said casing having a one-way coupling to said shaft and frictionally engaging with said wall whereby the rotation of the shaft in one direction will be frictionally retarded, and a second element continuously coupled to said shaft and telescopically and frictionally engaging with said first element, whereby when the latter is not rotating with the shaft, the retardation of the shaft will be caused only by the friction between the two elements, the frictional contact area between the casing and first element being different than the frictional contact area between the two elements.

2. In a shock absorber for vehicles, an enclosed casing having a frusto-conical frictional wall, a shaft rotatable in said casing, a cup-shaped element in said casing having a one-way coupling to said shaft and having an outer frusto-conical surface in telescopic relation with and frictionally engaging with said wall whereby the rotation of the shaft in one direction will be frictionally retarded, and a second element continuously coupled to said shaft and within and frictionally engaging with the inner surface of said first element, whereby said elements and wall will have a compact telescopic relation and when the first element is not rotating with the shaft, the retardation of the shaft will be caused only by the friction between the two elements the frictional contact area between the casing and first element being different than the frictional contact area between the two elements.

3. In a shock absorber for vehicles, a casing having a frusto-conical frictional seat, a shaft rotatable in said casing, a disc fitting over and coupled to the shaft so as to be rotatable therewith, a ring having a peripheral wall fitting in said seat, a one-way clutch connection between the disc and the ring whereby the latter will be driven by the shaft in one direction and be free thereof when the shaft moves in the opposite direction, and means for yieldingly pressing the ring into said seat.

4. In a shock absorber for vehicles, a casing having a frictional seat, a shaft rotatable in said casing, a disc fitting over and coupled to the shaft so as to be rotatable therewith, a ring having a peripheral wall fitting in said seat, said disc having in its periphery notches with arcuate inner ends, pawls in said notches and rockable upon said arcuate ends into and out of clutching engagement with the ring, springs for yieldingly urging the pawls in a direction to clutch with the ring, said disc fitting against one wall of the casing which confines the pawls within the notches, a plate secured to the disc and overlying the notches to confine the pawls therein, and means for yieldingly pressing the ring into said seat.

5. In a shock absorber for vehicles, a casing having a convergent seat, a shaft rotatable in said casing, a member fitting in said seat and having a one-way clutch connection to said shaft, a second member in frictional engagement with the first member and continuously coupled to said shaft, and means for yieldingly pressing the members together and into the seat, whereby when the shaft rotates in one direction the members will move together and the shaft will be retarded by the friction in the seat, and when in the opposite direction the first member will remain stationary and the shaft will be retarded by the friction between the members.

6. In a shock absorber for vehicles, a casing having a frusto-conical friction wall, a shaft rotatable in said casing, a cup-shaped element in said casing having a one-way coupling to said shaft and having an outer frusto-conical surface in telescopic relation with and frictionally engaging with said wall, whereby rotation of the shaft in one direction will be frictionally retarded, and be unretarded in the other direction, and a second cup-shaped element continuously coupled to said shaft and within and frictionally engaging with the inner surface of the first element, whereby said casing and two elements will have a telescopic relation, a spider of resilient material disposed across the open face of said second element and having the ends of its arms turned backwardly toward the center and disposed within said second element for pressing said elements and casing into frictional engagement with one another.

7. In a shock absorber for vehicles, a base having a friction surface, a shaft rotatably carried by the base, a pair of members having frictional engagement with one another, and one of them with the said surface, one of the members being continuously coupled to said shaft for rotation therewith in both directions, and the other being coupled to the shaft by a one-way clutch so as to rotate therewith only in one direction, a spring element pressing the members together and against the said surface, said spring element comprising a spider of sheet material having the spider arms curled backwardly all upon the same face of the spider, and means for placing the element under variable stresses to vary the friction between the members and between the said friction surface and one of the members.

In witness whereof, I hereunto subscribe my signature.

LOUIS MASTRANGEL.